May 3, 1960 N. C. FULMER 2,935,593
DIRECTLY-HEATED TIP FOR A SOLDERING TOOL
Filed Nov. 22, 1957
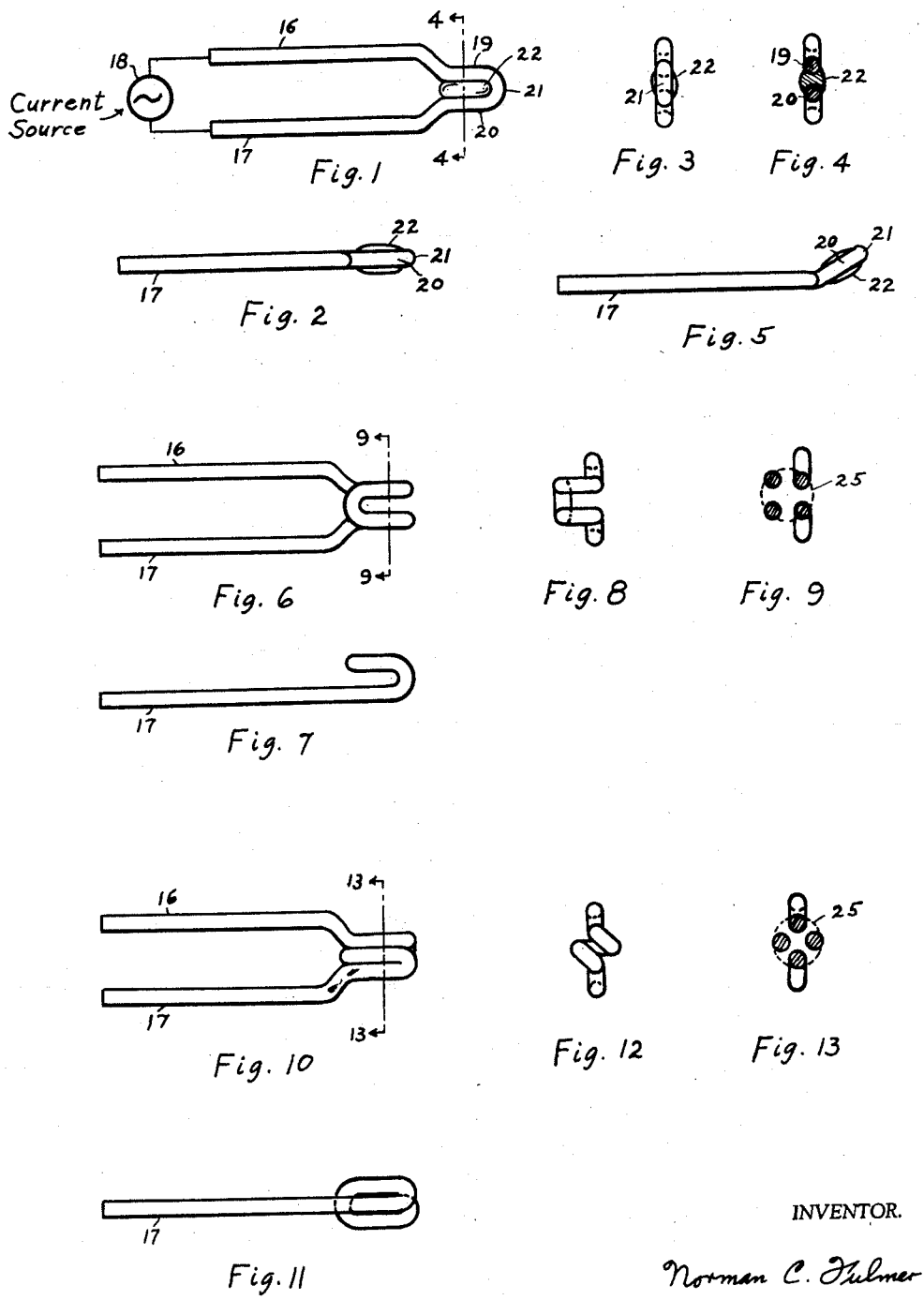
INVENTOR.
Norman C. Fulmer

United States Patent Office 2,935,593
Patented May 3, 1960

2,935,593

DIRECTLY-HEATED TIP FOR A SOLDERING TOOL

Norman C. Fulmer, Trumbull, Conn.

Application November 22, 1957, Serial No. 698,244

11 Claims. (Cl. 219—26)

This invention relates to electrically heated tips for soldering tools, and more particularly to wire tips which are directly heated by means of electric current. This is a continuation-in-part of U.S. Patent No. 2,814,712, issued November 26, 1957.

Directly heated wire soldering tips are generally U-shaped, for convenience, the ends of the "legs" of the U-shaped wire being connected to a source of current for heating the wire tip. The wire at the forward end of the tip, at the rounded bottom of the U shape, is the working portion of the tip, and molten solder forms a thin layer on the surface of the wire at this working portion. Directly-heated wire soldering tips have the desirable properties of heating quickly and of consuming relatively little electrical power. However, conventional wire soldering tips have some undesirable properties such as: (1) Due to their small mass, their temperature drops quickly when they are touched against an object to be soldered; and (2) their shape is inconvenient for making a good heat-transfer contact with an object to be soldered. Certain prior-art soldering tips have overcome these drawbacks, to a certain extent, by providing a suitably shaped enlargement or projection extending forwardly at the working portion of the soldering tip. However, this adds considerable cost to what would otherwise be a simple and inexpensive tip formed from a piece of wire.

An object of the present invention is to provide a simple and inexpensive wire soldering tip which overcomes the undesirable properties enumerated above. Other objects are to provide a wire soldering tip which heats quickly and uniformly and which has a long life. Still other objects will be apparent.

In accordance with the invention, a soldering tip comprises a wire bent to form a U shape, the legs of the wire adjacent the apex of the U being spaced so closely together that molten solder forms a lump therebetween. This lump of solder provides, in effect, a substantial part of the working portion of the tip and adds heat-retaining mass to the tip, and this is accomplished more easily and at much lower cost than the specially formed tips of the prior art. The lump of solder also provides additional advantages over the prior-art tips, as will be clear from the following description of some preferred embodiments of the invention.

In the drawing:

Figs. 1, 2 and 3 are top, side and end views, respectively, of a preferred embodiment of the invention;

Fig. 4 is a cross-sectional view taken on the line 4—4 of Fig. 1;

Fig. 5 is a side view of a modification of the embodiment shown in Fig. 2;

Figs. 6, 7 and 8 are top, side and end views, respectively, of another embodiment of the invention;

Fig. 9 is a cross-sectional view taken on the line 9—9 of Fig. 6;

Figs. 10, 11 and 12 are top, side and end views, respectively, of a further embodiment of the invention; and Fig. 13 is a cross-sectional view taken on the line 13—13 of Fig. 10.

In the embodiment shown in Figs. 1–4 of the drawing, an elongated electrically conductive material, such as 12 gauge wire, which may be of a relatively low-resistance material such as copper or a relatively higher resistance material such as iron or steel, or other suitable current-conductive material, is bent to form a generally U-shaped configuration having legs 16, 17 which may be connected to a switch-operated current-supply source 18. The wire of which the tip is formed may have a circular cross-section, as shown in the preferred embodiments, or may have a square or rectangular cross-section. The portions 19, 20 of the wire immediately adjacent the apex 21 of the U shape are spaced sufficiently close together so that molten solder will form a lump 22 therebetween. It has been found that, when No. 12 wire is used in forming the tip, the spacing between the portions 19 and 20 should be about the same as or less than the wire diameter. When the tip is heated and solder is applied thereto, the lump 22 of molten solder forms between the closely-spaced wire portions 19 and 20, and surface-tension of the solder is effective in causing the lump to be retained in the small gap between the wire portions 19, 20. The legs 16 and 17 are sufficiently far apart so as to prevent molten solder from forming a lump therebetween. When the tip is cooled, the lump 22 of solder solidifies.

When the tip is heated again by means of current from the current source 18, a portion of the current flows through the shunt path formed by the lump 22 of solder between the wire portions 19 and 20. This current heats the solder lump directly, in addition to the heat provided due to the current which flows through the wire of the tip. These combined heating effects cause the solder lump 22 to heat up and melt quickly, thus readying the tip for use. Furthermore, the tip heats uniformly because the lump of solder causes an even heat distribution to occur throughout the working portion of the tip.

The above-described soldering tip provides a desirable extra heat-retaining mass due to the lump of solder, so that the tip can be used for soldering larger and heavier objects more readily and more quickly than is the case of a tip comprising wire only. Also, the lump of molten solder, which bulges outward slightly from the sides of the tip, is useful because, when the tip is suitably placed in contact against an object to be soldered, the molten solder comes into contact with and conforms to the shape of a portion of the surface area of the object, even if this surface area is irregular, thereby causing efficient transferral of heat from the tip to the object. When the apex of the tip becomes worn thin or becomes severed due to wear and corrosion, the solder lump insures continued effective heating and functioning of the tip, thereby extending its useful life. A new tip can be made easily and quickly by bending a piece of wire, for example, No. 12 gauge wire, into shape. These desirable features are obtained due to the new concept, in accordance with the invention, of utilizing a portion of the tip behind the apex thereof as the working portion, and by suitably shaping this working portion so that molten solder will form a useful part of the tip, whereas the prior art concept has been to place any extra tip material forwardly of the apex of the U-shaped tip.

Fig. 5 illustrates a modification of the above-described tip, in which the working portions 19, 20, 22 of the tip is bent away from the plane of the leg portions 16, 17. This inclination of the working portion of the tip makes it more convenient, in certain instances, to position the tip so that the outwardly bulging lump of solder will come ino contact with an object to be soldered.

In the embodiment of Figs. 6–9, the working portion of the tip is bent back upon itself so as to provide four closely spaced parallel portions of wire adjacent the apex of the tip. This construction can cause the formation of, and hold, a larger lump of solder, as is indicated by the dotted line 25 in Fig. 9 which generally indicates the cross-sectional outline of the lump of solder.

Figs. 10–13 illustrate another construction for providing a relatively large lump of solder. The wire at the working portion of the tip is bent, as shown, to form a two-turn winding having closely spaced mutually parallel sides adjacent the apex of the tip. The dotted line 25 generally indicates the cross-sectional outline of the lump of solder which is formed by this tip.

While preferred embodiments of the invention have been shown and described, other embodiments and modifications, which will occur to those skilled in the art, will fall within the scope of invention as defined in the following claims.

What is claimed is:

1. A soldering tip comprising an elongated electrically conductive member formed to have a U-shaped loop, the legs of said U-shaped loop adjacent the apex of said loop being spaced sufficiently close together so that molten solder will bridge the gap therebetween.

2. A soldering tip comprising an elongated electrically conductive member formed to have a generally U-shaped loop, the portions of the legs of said U-shaped loop adjacent the apex of said loop being spaced sufficiently close together so that molten solder will bridge the gap therebetween, the portions of the legs of said U-shaped loop adjacent said first-named portions being spaced sufficiently far apart so as to prevent molten solder from bridging the gap therebetween.

3. A soldering tip comprising an elongated current conductive member shaped to have a tight bend therein to form an apex of said soldering tip, the portions of said elongated member adjacent said apex being spaced sufficiently close together so that molten solder forms a lump therebetween.

4. A soldering tip adapted to be heated by passing current therethrough, comprising an elongated electrically conductive member shaped to provide a U-bend, and means connected for passing current through said member, the portions of said member adjacent the apex of said U-bend being positioned so closely together that molten solder will form a current-carrying lump therebetween.

5. A soldering tip as claimed in claim 4, in which the portions of said member adjacent said first-named portions are positioned so far apart that molten solder is prevented from forming a current-carrying lump therebetween.

6. A soldering tip comprising an elongated current-conductive member bent to form a U-shaped bend at an end of said tip, the portions of said member adjacent said end being spaced a given distance apart, and a lump of solder positioned between said portions, said lump of solder being in engagement with said portions thereby providing a current path between said portions, said given distance being sufficiently small so that said lump of solder when molten will be retained between said portions.

7. A soldering device including a tip comprising an elongated current-conductive member shaped to form a U-bend having the leg portions thereof adjacent the apex of said U-bend positioned so closely mutually adjacent that molten solder forms a current-carrying lump therebetween, and a current source connected to pass current through said elongated member.

8. A soldering device including a tip comprising an elongated current-conductive member bent tightly back upon itself at an end of said tip, the portions thereof adjacent the apex of said bend being positioned so closely mutually adjacent that molten solder forms a current-carrying lump therebetween, and a current source connected to the other end of said tip to pass current through said elongated member.

9. A soldering tip comprising an elongated electrically conductive member formed to have a generally U-shaped loop, the portions of the legs of said loop adjacent the apex thereof lying in a first plane and being spaced sufficiently close together that molten solder will form a lump therebetween, the portions of said legs of said loop adjacent said first-named portions lying in a second plane and being spaced sufficiently far apart to prevent solder from forming a lump therebetween, said first and second planes being inclined with respect to each other.

10. A soldering tip comprising an elongated electrically conductive member shaped to have a tight bend therein whereby the leg portions of said member adjacent said bend are sufficiently close together so that molten solder will bridge the gap therebetween, said leg portions being tightly bent backwardly along themselves to provide a pair of additional closely spaced portions thereof which are spaced sufficiently close together that molten solder will bridge the gap therebetween.

11. A soldering tip comprising an elongated electrically conductive member shaped to provide a plurality of elongated loops having a plurality of substantially straight sides, said straight sides being positioned sufficiently close together so that molten solder will be retained in a lump thereby.

References Cited in the file of this patent

UNITED STATES PATENTS

| | | |
|---|---|---|
| 449,258 | Robinson | Mar. 31, 1891 |
| 2,405,866 | Weller | Aug. 13, 1946 |
| 2,501,192 | Scholler | Mar. 21, 1950 |
| 2,558,192 | Nockunas | June 26, 1951 |
| 2,593,947 | Weller | Apr. 22, 1952 |

FOREIGN PATENTS

| | | |
|---|---|---|
| 424,218 | Italy | Aug. 8, 1947 |

OTHER REFERENCES

American Machinist, June 26, 1950, page 141.